Jan. 16, 1945.  C. E. KRAUS  2,367,221
CUTTER
Filed May 8, 1943   3 Sheets-Sheet 1
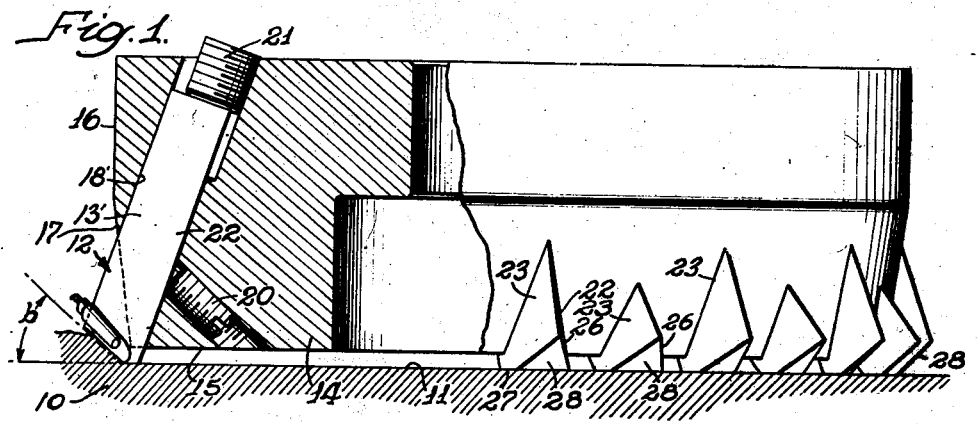
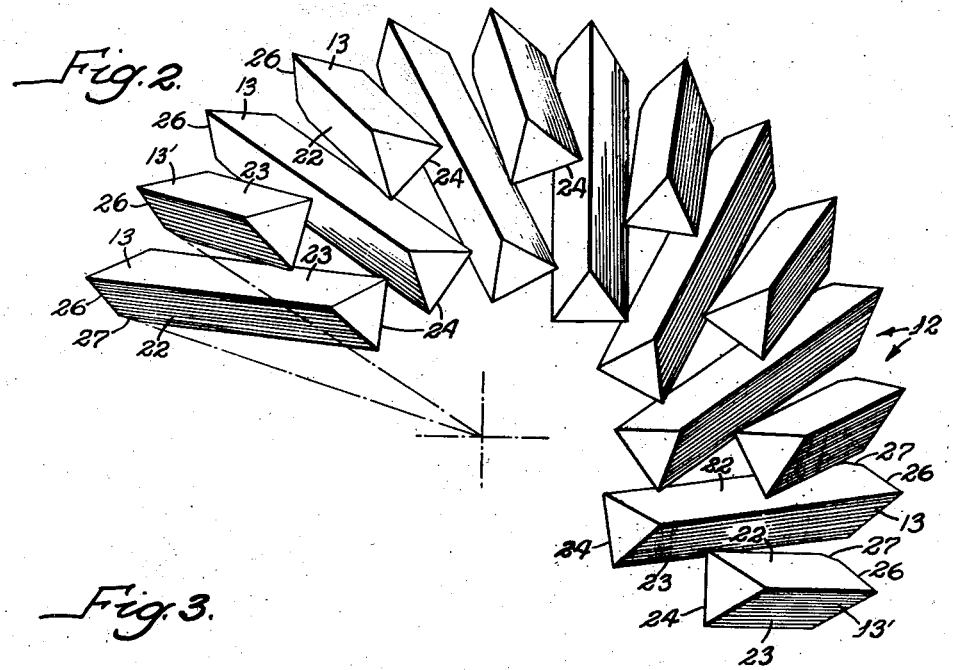
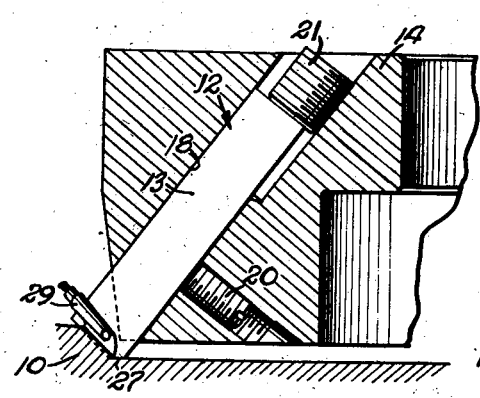
INVENTOR
Charles E. Kraus
By Parker, Carlson, Pitzner and Hubbard
ATTORNEYS Jan. 16, 1945. C. E. KRAUS 2,367,221
CUTTER
Filed May 8, 1943 3 Sheets-Sheet 2
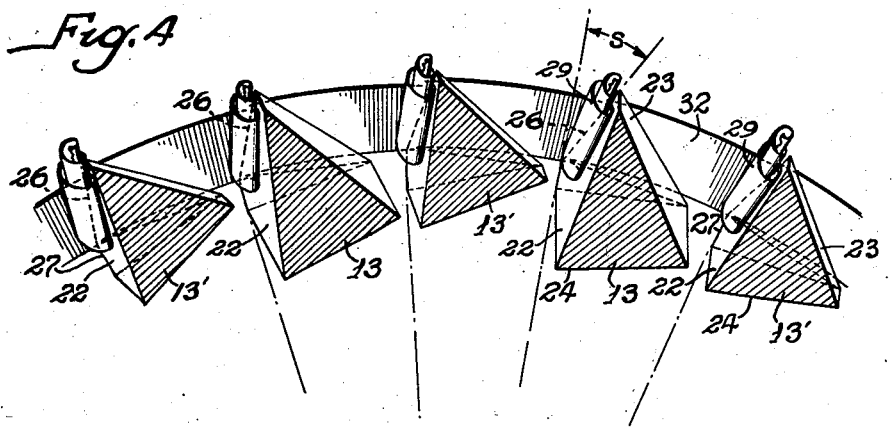
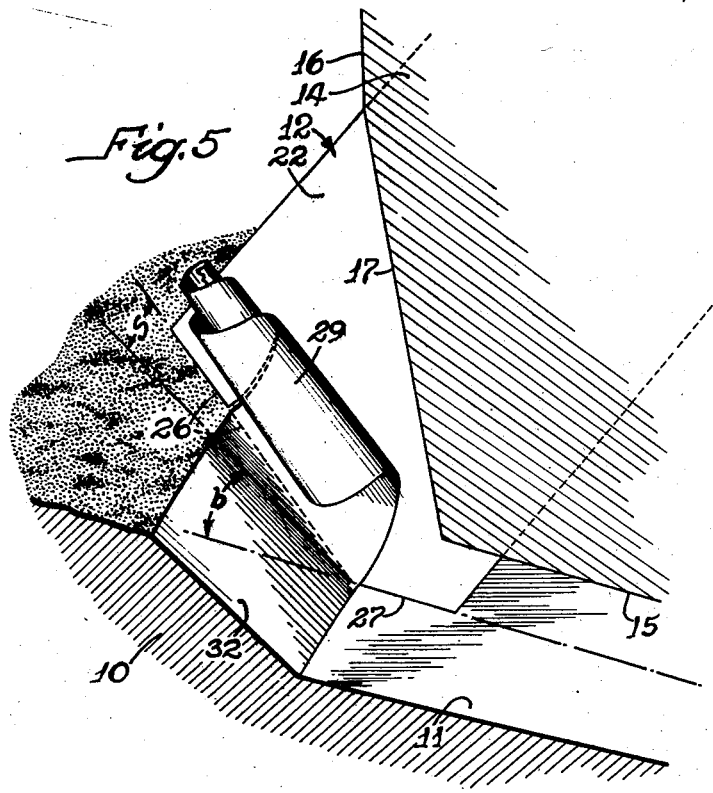
INVENTOR
Charles E. Kraus
By Parker, Carlson, Pitzner + Hubbard
ATTORNEYS Jan. 16, 1945.  C. E. KRAUS  2,367,221
CUTTER
Filed May 8, 1943  3 Sheets-Sheet 3

INVENTOR
Charles E. Kraus,
By Parker, Carlson, Pitzner & Hubbard
ATTORNEYS

Patented Jan. 16, 1945

2,367,221

UNITED STATES PATENT OFFICE 2,367,221

CUTTER

Charles E. Kraus, Rochester, N. Y., assignor to Weddell Tools, Inc., Rochester, N. Y., a corporation of New York Application May 8, 1943, Serial No. 486,152

6 Claims. (Cl. 29—105)

This invention relates to multiple toothed rotary cutters of the type employed for face milling and similar operations.

One object is to provide a cutter of the above character having teeth constructed and arranged in a novel manner such as to effect positive control of the chip flow and thereby permit close spacing of the teeth with a resultant increase in the permissible rate at which the cutter may be fed.

Another object is to provide a cutter of the above character which may be adapted readily for rotation in either direction.

Other objects and advantages of the invention will become apparent from the following detailed description taken in connection with the accompanying drawings, in which Figure 1 is an elevational view of a cutter embodying the present invention, a portion being shown in section.

Fig. 2 is a fragmentary perspective view showing the arrangement of the cutter blades.

Fig. 3 is a fragmentary diametrical sectional view of the cutter showing a different blade than the one shown in the section part of Figure 1.

Fig. 4 is a plan view of the work surface with the teeth of the cutter shown in section taken along a horizontal plane immediately above the chips shown in Fig. 1.

Fig. 5 is a perspective view illustrating the chip flow.

Figure 6:
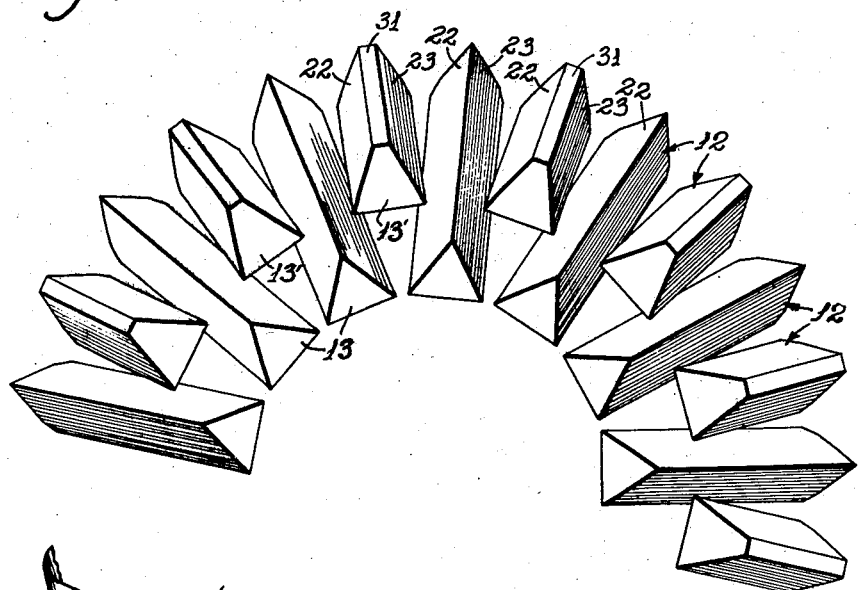
Figs. 6 and 7 are views similar to Figs. 2 and 5, but showing a modified form of the cutter.

The invention is shown in the drawings embodied in an inserted blade milling cutter for removing a layer of metal from a workpiece 10 to form a smooth surface 11 thereon during relative feeding movement between the workpiece and the cutter along the work surface to be milled while the cutter is turning in the intended direction of rotation. It is to be understood that I do not intend to limit the invention by such exemplary disclosure, but aim to cover all modifications, alternative constructions, and uses falling within the spirit and scope of the invention as expressed in the appended claims.

Referring first to the form of the invention shown in Figs. 1 through 5, the cutter comprises generally an annular series of teeth 12 constituting the projecting ends of blades or bars 13 and 13' of cutting material mounted in a ring-like body 14 which has an end surface 15 and a peripheral or side surface 16 the lower half portion 17 of which converges somewhat toward the end 15.

The blades are disposed in recesses 18 and 18' broached through the body 14 and inclined relative to both the end and side surfaces 15 and 16 of the body so as to flare outwardly in the direction of the end surface 15. The projecting blade ends are equidistant from the cutter axis and spaced therefrom so as to intersect the end surface 15 close to its outer edge and the side surface 17 substantially throughout the full depth of the latter.

Thus the major projecting portion of each tooth is disposed laterally from the side 17 of the body and only a short distance from the end surface 15 which may be disposed close to the finished work surface 11. The adjacent recesses 18 and 18' are inclined at different angles to the plane of rotation as shown in Figs. 1, 2, and 3. The recess ends which open on the top of the body 14 are thus arranged in a smaller annular row than the ends of the recesses 18' and a more rugged mounting of the closely spaced blades is obtained.

The blades may be locked in the body in any suitable way. Herein, each blade is clamped against one side wall of its recess by a set screw 20 and is backed at its other end by a set screw 21 threading into the upper end of the blade recess. By advancing the screws 21, the blades may be projected endwise and thus adjusted for wear.

To permit of the close spacing of the teeth 12 while controlling the flow of the chips removed from the work in a manner to avoid clogging of the cutter, the teeth 12 and the blades are made of triangular cross section with the trailing and leading sides of the adjacent teeth coacting to define passages which flare away from the cutting edges in the direction in which the chips naturally flow. In the present instance, the blades 13 and 13' and their recesses 18 and 18' are of substantially equilateral triangular cross section and are arranged with two side surfaces 22 and 23 of the blades converging outwardly from the cutter axis while the third surface 24 faces inwardly toward the axis. Thus, one apex or pointed side portion is disposed outwardly beyond the peripheral surface 17 of the body. The leading side 22 of each tooth terminates at the end of the blade in the main cutting edge 26 and, therefore, constitutes the cutting face of the tooth. This side is positioned so that the line of intersection with the plane of rotation of the cutter is generally radial, the trailing side 23 of the tooth thus being inclined at a somewhat greater angle to a radius of the cutter.

With the blade triangle arranged as above described, it will be observed that the leading or cutting face 22 of each tooth coacts with the trailing side 23 of the preceding tooth and the intervening portions of the body surface 17 to form a pocket which flares outwardly. Owing to the inclination of the blades relative to the plane of cutter rotation, the walls of this pocket also diverge in a vertical direction along the body wall.

The invention contemplates positioning of the main cutting edges 26 in a manner such as to induce a natural flow of the chips upwardly through the flaring passages and along the body surface 17. To this end, the edges are inclined away from a perpendicular to the finished work surface and thus are set at a so-called bevel angle b. The end of each tooth is formed with a clearance face 28 (Fig. 1) and each main edge 26 intersects a secondary or clean-up edge 27 which defines the plane of the finished work surface in face milling.

With the blade set as above described and with the side 23 inclined at a substantially greater angle relative to a radius than the cutting face 22, beveling of the main edges 26 also imparts the necessary shear angles S to the cutting edges. These angles are varied slightly owing to the different inclinations of the adjacent blades. In operation of the cutter, the edges 26 remove successive layers of metal along the advancing inclined face 32 of the work, and form chips 29 which, owing to the shear angles employed are induced to flow in a generally upward direction as shown. Because the passageways between the adjacent teeth diverge in this direction, there is no danger of the passageways becoming clogged. Thus, the chips curl upwardly and along the body surface 17 until they break and fall away from the cutter and are carried free of the work.

Figure 7:
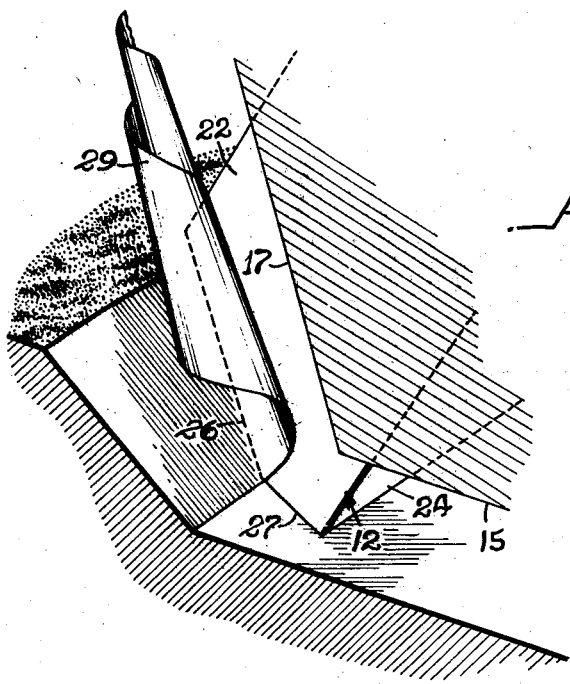

By positioning the blade triangle properly, the cutter may be adapted for operation in either direction of rotation. Such a cutter is shown in Figs. 6 and 7 in which the blades 13 and 13' are positioned in the body so that the blade triangles are bisected by radial planes through the lines of intersection of their sides 22 and 23. For strength purposes, the outer apex of the blades 13' is flattened as indicated at 31. By shaping the ends of the teeth 12 properly, the main cutting edge may be formed along the side surface 22 to adapt the cutter for counterclockwise rotation or along the side 23 adapting the cutter for reverse rotation. In either of these cases, the main cutting edges 26 would be set at a somewhat greater bevel angle than in the cutter first described and the chips 29 would, as a result, be thrown outwardly from the cutter body as illustrated in Fig. 7.

I claim as my invention:

1. A face milling cutter having, in combination, a body having end and peripheral surfaces and adapted for rotation about a central axis, said peripheral surface being tapered and converging toward said end surface, an annular series of teeth mounted on and projecting from said body beyond said end surface and laterally of said peripheral surface, said teeth diverging away from said axis and being of generally triangular cross-section with one apex of the triangle pointing and disposed outwardly beyond said tapered surface so that the leading side of one tooth and the trailing side of the preceding tooth coact with the tapered body surface to define a chip passage which flares outwardly from the body and also along said tapered surface away from the tooth end, and cutting edges formed on said teeth at the end of the leading side surfaces thereof and defining a frusto-conical cutting face operable to remove successive layers from a workpiece and direct the flow of the chips along said tapered body surface in the direction of divergence of said passageways.

2. A face milling cutter having, in combination, a body having end and peripheral surfaces and adapted for rotation about a central axis, an annular series of teeth mounted on and projecting from said body beyond said end surface and laterally of said peripheral surface, said teeth diverging away from said axis and being of generally triangular cross-section with one apex projecting outwardly from the body so that the leading side of one tooth and the trailing side of the preceding tooth define a chip passage which flares outwardly from the body and also along said peripheral surface away from the tooth end, and cutting edges formed on said teeth at the end of the leading side surfaces thereof and defining a frusto-conical cutting face operable to remove successive layers from a workpiece and direct the flow of the chips along said peripheral surface in the direction of divergence of said passages.

3. A face milling cutter having, in combination, a body having a tapered peripheral surface and adapted for rotation about a central axis, an annular series of teeth of generally triangular cross-section mounted in said body with the apex between two side surfaces of the triangle pointing outwardly and disposed laterally beyond said surface, the projecting portions of the sides of adjacent teeth defining a chip passage which flares along said surface, and cutting edges formed on said teeth at the end of the leading projecting tooth sides and acting to direct the flow of chips away from the work surface finished by the cutter and along said peripheral body surface in the direction of divergence of said passages.

4. A cutter having, in combination, a body having a side peripheral surface and adapted for rotation about its longitudinal axis, an annular series of teeth on the body, each of generally triangular cross section and having leading and trailing sides projecting laterally of the body beyond said surface and converging toward each other and outwardly from the body substantially to an apex line, the leading side of one tooth and the trailing side of the preceding tooth defining a chip passage, and cutting edges formed on said teeth at the end of said leading sides and acting during operation of the cutter to remove successive layers from a workpiece and direct the flow of the chips through said passages in the direction of divergence thereof and along said peripheral surface.

5. A cutter having, in combination, a body having a side peripheral surface and adapted for rotation about its longitudinal axis, an annular series of teeth on the body, each of generally triangular cross-section and having sides projecting laterally of the body beyond said surface and converging toward each other and outwardly from the body substantially to an apex line, the leading side of one tooth and the trailing side of the preceding tooth defining a chip passage, and cutting edges formed along the ends of said leading sides and inclined relative to the plane of rotation of the cutter so as to direct the flow of chips away from the finished work surface in the direction of divergence of said passages.

6. A cutter having, in combination, a body adapted for rotation about its longitudinal axis and having a peripheral surface, an annular series of teeth mounted on and projecting from said body beyond said peripheral surface and being of generally triangular cross-section with one apex projecting outwardly from the body and with each projecting side surface disposed at substantially the same angle relative to a radius through the apex, and a cutting edge formed on one projecting side of each tooth to constitute such side a cutting face and to direct the flow of the chips through the flaring passages defined by the projecting side surfaces of adjacent teeth.

CHARLES E. KRAUS.